May 13, 1924.
C. L. TRAPP
1,494,041
TRUCK DUMPING MECHANISM
Filed Sept. 28, 1923
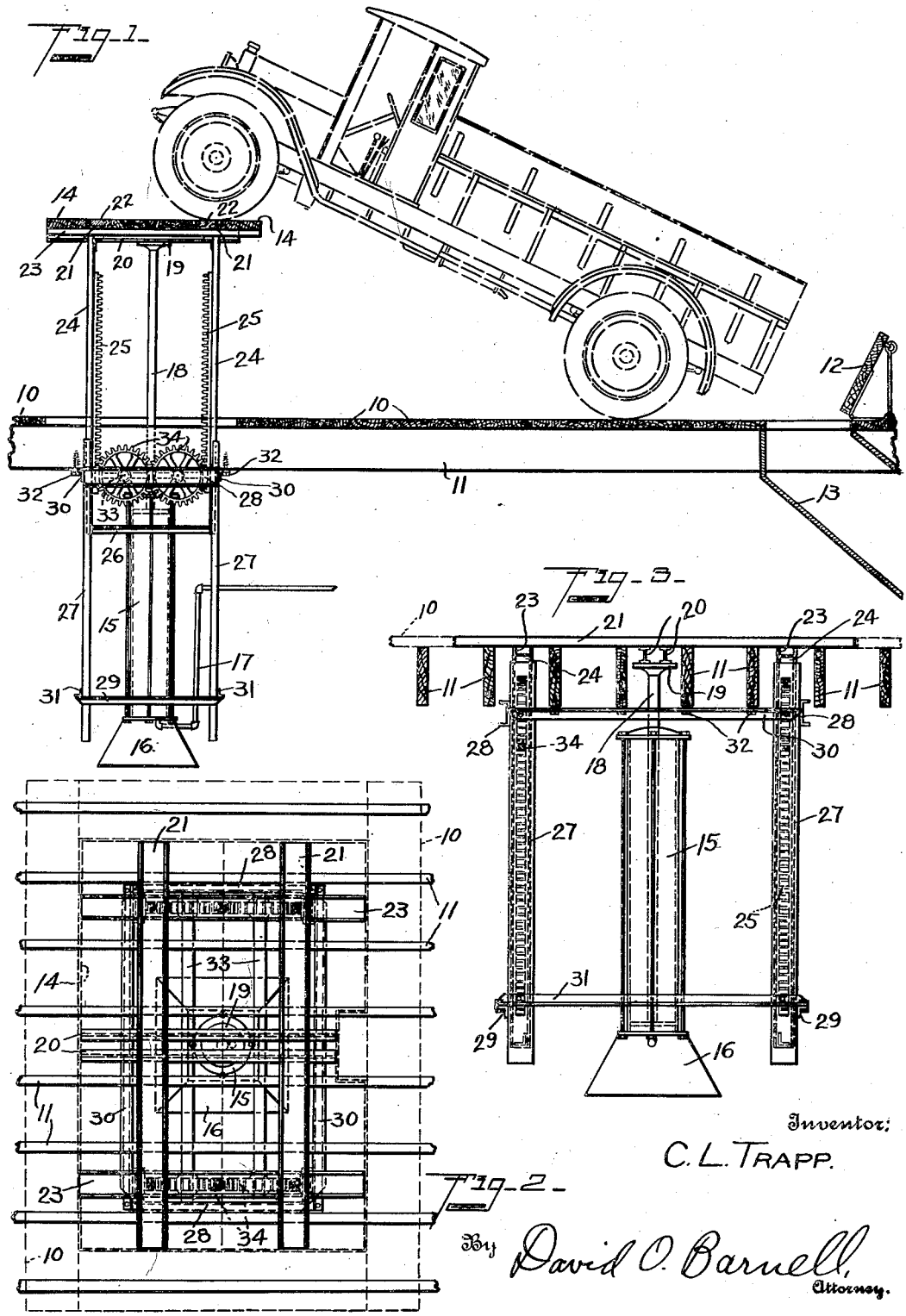

Patented May 13, 1924.

1,494,041

UNITED STATES PATENT OFFICE.

CHARLES L. TRAPP, OF OMAHA, NEBRASKA, ASSIGNOR OF ONE-HALF TO DRAKE-WILLIAMS-MOUNT CO., OF OMAHA, NEBRASKA, A CORPORATION OF NEBRASKA.

TRUCK-DUMPING MECHANISM.

Application filed September 28, 1923. Serial No. 665,401.

*To all whom it may concern:*

Be it known that I, CHARLES L. TRAPP, a citizen of the United States, residing at Omaha, in the county of Douglas and State of Nebraska, have invented certain new and useful Improvements in Truck-Dumping Mechanism, of which the following is a specification.

My invention relates to mechanism for use in discharging or dumping the load from a motor truck or like vehicle, by elevating the front portion of the vehicle and thus inclining the body so that the load may be discharged by gravity from the rear end thereof. Such dumping mechanism is now in general use for grain elevators, cereal mills, and in other places in which it is desirable that grain or like materials may be quickly discharged from motor trucks. My present invention is especially adapted for use in connection with truck dumping mechanism of the type shown in U. S. Letters Patent No. 1,350,087, issued to me August 17, 1920, in which there is provided a vertically movable horizontal platform for supporting and elevating the front portion of the vehicle, actuating means such as a fluid-pressure-actuated piston for elevating and controlling descent of the platform, and a plurality of vertical, gear-connected, guided, equalizing-legs arranged near the corners of the platform for holding the same level regardless of unsymmetrical loading thereof. It is the object of my invention to provide in a truck dumping mechanism of this class a specially constructed elevating platform which may be installed in connection with the usual driveway of an elevator or mill, after merely removing enough of the floor-planks of the driveway to receive the platform structure, but without removing or cutting away the original floor-supporting joists of the driveway. A further object of my invention is to provide means by which the guiding and equalizing devices may be suspended from the floor-joists, and the construction of supports or special foundations for these devices thereby avoided.

In the accompanying drawings Fig. 1 is a longitudinal vertical section through a driveway provided with truck dumping mechanism embodying my invention, Fig. 2 is a plan view of the elevating platform frame, the floor-planking being removed, and Fig. 3 is an end view of the same.

In the illustrated structure the floor-planking 10 of the driveway for the vehicles is supported upon longitudinal joists 11 which extend through continuously, and which rest upon the usual supporting structures (not shown). A door 12 is indicated in Fig. 1, for normally covering the opening to the dump-chute 13 into which the material is to be delivered from the trucks. The elevating platform is suitably spaced from the door 12 of the dump-chute, so that when the rear end of a truck-body is positioned to discharge into the chute, the front wheels of the truck will rest upon the platform, of which the surface is normally flush with the flooring 10. The frame of the platform is preferably of metal construction throughout, and its upper surface or floor 14 consists principally of transverse planks similar to those of the floor 10 of the driveway. The elevating cylinder 15 is disposed beneath the platform, preferably although not necessarily, at the center thereof, said cylinder being supported upon a suitable foundation 16, and having connected therewith a pipe 17 through which the motive fluid is received and discharged. A piston within the cylinder is connected with the piston-rod 18 which extends from the upper end of the cylinder, and at the upper end of said piston-rod is carried a head or plate 19, which lies between a pair of the floor-joists 11 of the driveway, as best shown in Fig. 3. On said plate or head 19 is supported a pair of I-beams 20 which extend longitudinally between the joists, the upper edges of said I-beams being normally at the same level as the upper edges of the joists. Said I-beams 20 support a pair of transversely extending channels or cross-beams 21 which lie in the floor of the platform intermediate its transverse center-line and its front and rear edges, the depth of said channels being substantially the same as the thickness of the flooring 14, and the spaces between the upwardly extending flanges of the channels being closed by wood filler-blocks 22, so that the surface of the platform is level throughout. Beneath the end portions of said transverse channels or cross-beams 21 are secured a pair of channels 23 which extend longitudinally between pairs of the floor-joists 11. The platform flooring is secured to and supported upon said channels 23, and to the lower sides of said channels are secured the legs 24. The latter consist of metal channels disposed with their flanges extending toward the adjacent front and rear edges of the platform, and upon their backs or adjoining sides are secured the racks 25. The lower ends of the pairs of legs adjacent to the ends of the platform are connected to each other by horizontal angle-bars 26. Each pair of the legs fits slidably between guides formed by a pair of vertically extending channels 27, disposed with their flanges inwardly, the legs being of a width to fit between said flanges. Each pair of the guide-channels is connected together near the top by a horizontal channel 28, and near the bottom by a horizontal angle-bar 29. The guide-channels are connected transversely by upper angle-bars 30 and lower angle-bars 31, the former being secured to the lower edges of the joists 11 by lag-screws 32, thereby suspending from said joists the entire guide-frame formed by the members 27, 28, 29, 30 and 31. On the inner sides of the channels 28 are secured bearings for the ends of transverse shafts 33 on which are secured the pairs of intermeshing gears 34. Each pair of the gears meshes with the racks 25 on the adjacent pair of the legs 24.

The operation of the described mechanism is substantially the same as that in my former patent, hereinbefore referred to, the raising and lowering of the platform being effected by admitting fluid under pressure to the cylinder 15 for raising the platform, and releasing the fluid to permit the weight of the platform and its load to restore the parts to their normal lowered position. The intermeshing racks and gears, connected with the guide-legs of the platform, insure the raising and lowering of all corners of the platform equally, regardless of unequal distribution of the load, and prevent racking strains of the platform-frame.

The advantage of my present invention lies principally in the facility with which the same may be installed, with a minimum alteration of the original driveway in order to receive the elevating platform structure and its controlling means. The guide-frame, being suspended from the floor-joists of the driveway, requires no other support. The metal frame of the elevating platform is so constructed that all of its parts which have a greater depth than the floor may extend down between the joists 11. The platform flooring 14 is supported at the center directly upon the beams 20, and the end portions of said flooring rest upon the channels 23, the latter being supported by suspension beneath the cross-beams 21. Thus the only preparation required for installing the mechanism, is the construction of a suitable foundation for the elevating cylinder 15, and the removal of the driveway flooring 10 for a space sufficient to receive the elevating platform, without cutting away any part of the floor-joists 11.

Now, having described my invention, what I claim and desire to secure by Letters Patent is:

1. In a mechanism of the class described, an elevating platform comprising transverse flooring, a plurality of transversely spaced longitudinal supports extending beneath said flooring, and cross-beams extending above said longitudinal supports and interspaced with the flooring, some of the longitudinal floor-supporting members being suspended from said cross-beams and the cross-beams being supported by the other longitudinal members, whereby a lifting force exerted upon the latter will be transmitted by the cross-beams to said suspended floor-supporting members.

2. In a mechanism of the class described, the combination with a floored driveway having longitudinal supporting joists, of an elevating platform having a floor normally in the same level as the driveway floor, the joists of the latter extending continuously beneath said platform floor, cross-beams interspaced horizontally with the platform flooring, and beams interspaced with said joists and extending longitudinally beneath the platform flooring and the cross-beams, some of said longitudinal beams being supported from the cross-beams, and the others constituting the primary support for the entire platform.

3. A structure as set forth in claim 2, including guide-legs depending from the longitudinal beams, and guiding and equalizing devices operatively connected with said legs and suspended from the joists of the driveway floor.

4. A structure as set forth in claim 2, including elevating actuating means engageable with the longitudinal beams which form the primary support of the platform, vertical legs depending from the other longitudinal beams, guiding means for said legs, said guiding means being suspended from the joists of the driveway floor, and means carried upon said guiding means and operatively engaging the legs to equalize the vertical movements thereof.

CHARLES L. TRAPP.